No. 881,077. PATENTED MAR. 3, 1908.
E. A. HUDSON.
KITCHEN DEVICE.
APPLICATION FILED MAR. 28, 1906.
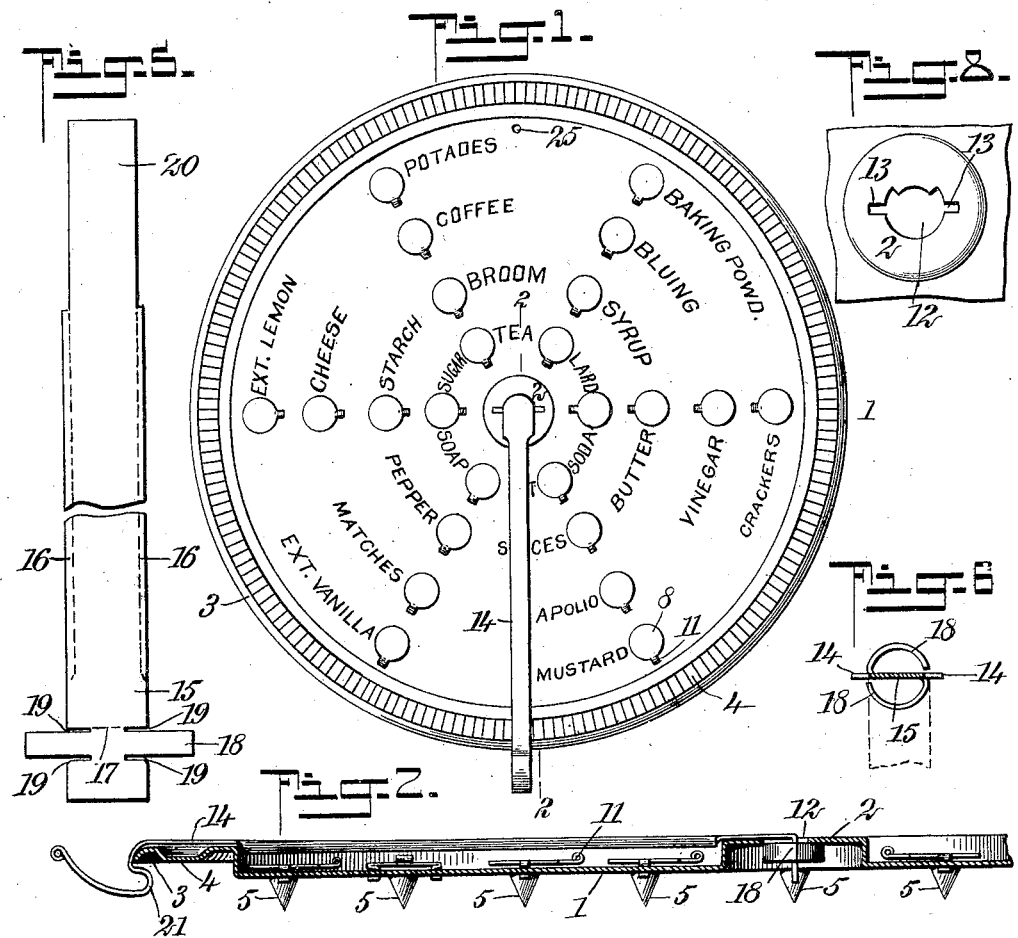
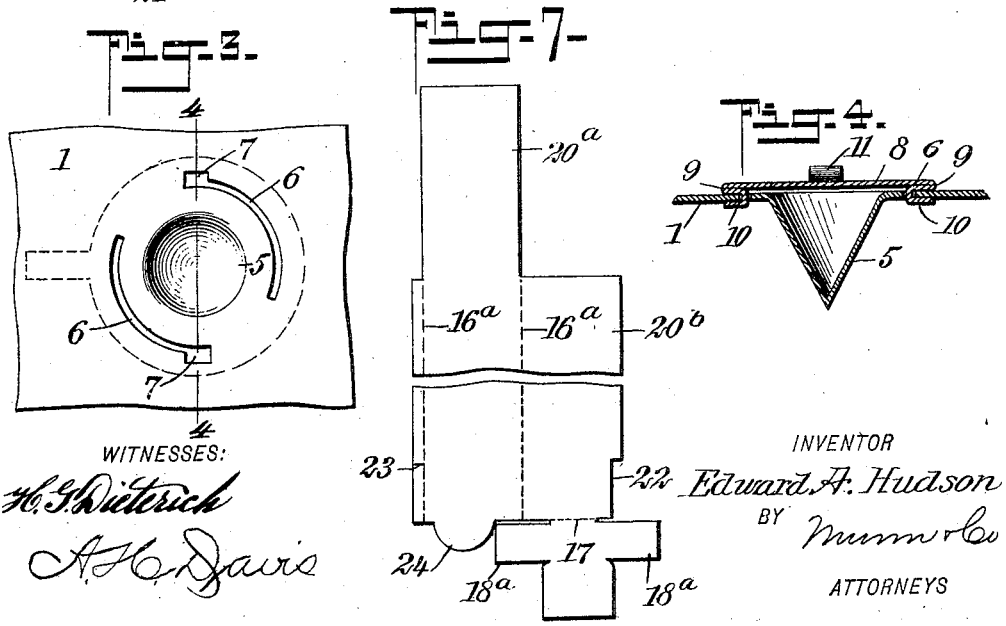
WITNESSES:
INVENTOR
Edward A. Hudson
BY Munn & Co
ATTORNEYS

UNITED STATES PATENT OFFICE.

EDWARD ADAMS HUDSON, OF OQUAWKA, ILLINOIS.

KITCHEN DEVICE.

No. 881,077.  Specification of Letters Patent.  Patented March 3, 1908.

Application filed March 28, 1906. Serial No. 308,466.

*To all whom it may concern:*

Be it known that I, EDWARD ADAMS HUDSON, a citizen of the United States, and a resident of Oquawka, in the county of Henderson and State of Illinois, have invented a new and Improved Kitchen Device, of which the following is a full, clear, and exact description.

This invention is an improvement in kitchen devices and has for an object, among others, to provide a device for trimming the edges of pies, punching ventilation holes in the top pastry thereof and also crimping and sealing the edge of the pie simultaneously, when the device is placed down in cutting position and slight pressure is exerted.

Other objects of the invention are to mark the pie in the number of pieces desired to be cut, by the action of a punching and ventilating means, and to provide on the face of the device the names of articles needed about the kitchen and indicating means to show and remind the user when any of the articles are exhausted.

Another object of the invention is to combine all of the above means in a simple, comparatively inexpensive and ornamental device, which is used and consulted every day in the year.

The above objects are accomplished by my invention, one embodiment of which is hereinafter disclosed.

Reference is to be had to the accompanying drawings forming a part of this specification, in which similar characters of reference indicate corresponding parts in all the figures.

Figure 1 is a plan of my improved kitchen device; Fig. 2 is an enlarged, sectional view on the line 2—2 of Fig. 1; Fig. 3 is a detail plan view of one of the ventilating protuberances as impressed in the body of the device; Fig. 4 is a sectional view on the line 4—4 of Fig. 3; Fig. 5 is a plan view of a blank from which the trimming arm and blade are made; Fig. 6 is a sectional plan showing how the inner end of the trimmer-blade is bent to be retained in the center of the disk; Fig. 7 is a plan view of a modified form of blank for making the trimming arm and blade, Fig. 8 is a plan view of the center of the device with the trimming arm removed.

The numeral 1 indicates a disk of sheet metal having a raised central portion 2 and a raised periphery 3 lying in substantially the same plane. In the center of the raised periphery the metal is depressed to about one-half the depth of the body of the disk, and corrugated with inclined sides, as shown at 4 in Figs. 1 and 2. The edge of the disk is curled over toward the body 1, forming a partial bead and extending to the depth of the corrugations 4. In the body of the disk 1 is provided a series of equally spaced conical protuberances 5 extending diametrically in rows across the face of the disk. These projecting protuberances are equally spaced apart and divide the disk into a number of equal sectors. The protuberances are made integral with the disk, as also the central raised portion 2 and the periphery 3, by shaping a round blank between suitable dies.

Concentric with each protuberance 5, two arcuate slots 6, 6 are formed in the disk 1, each slot terminating in an enlargement 7, the latter being disposed diametrically opposite each other. A preferably circular cap 8 is mounted over each protuberance 5, and is loosely secured in place by hook-like arms 10, that pass down through the enlargements 7, 7 and turn in slots 6, 6 and lap over the lower surface of the disk as shown for one cap in Fig. 4. Two of said arms for each cap are in diametrical alinement, and bent upon the cap in S-shape to form guides extending down through the slots 6, as already mentioned. A third arm 11 is formed on each cap 8, and is curled up at its outer end above said cap, it being designed to perform the function of a handle and also serve as an indicator to point to the name of some household article printed at one side of the cap, as shown in Fig. 1. If, for any reason, it is desired to remove the caps 8, they are turned on their guides until the hook-like arms register with the enlargements 7, when the cap may be readily lifted out.

The raised portion 2 has at its center an opening 12, partially circular, with radially-extending slots 13, one at each side, the edge of the opening opposite the circular portion being provided with teeth or projections. For trimming a pie a cutter 14 is provided, made from a blank 15 of sheet metal by turning the edges 16, as indicated in Fig. 5, said edge portions being lapped upon the under face of the blank, thereby strengthening the cutter arm and giving it a neat appearance. The end of the blank opposite that forming the cutter-blade is stamped out, forming wings 18 and slots 19 at both sides of the wings and extending into the blank. The dotted line 17 indicates the point at which the blank is bent at right angles, to form a pivotal connection with the disk at the hole 12. This connection is formed by passing the wings 18 through the slots 13 and bending them in opposite directions, forming an enlarged ring, as shown in Fig. 6. This construction prevents the accidental separation of the cutter-arm from the disk. The end 20 of the blank forming the cutter-arm 14 rests on the raised periphery 3 of the disk and is bent downwardly conforming to the partially beaded edge, then inwardly to a point 21 at which the pie is to be trimmed, and then outwardly and upwardly to provide a handle to operate the cutter. At 21 the edges of the cutter are preferably beveled or sharpened in order that a clean cut will be made when the edge of the pie is trimmed. The cutting is facilitated by the edge of the bead 3, which partly severs the overhanging dough before the cutter is brought into operation.

The modified form of the cutter arm blank shown in Fig. 7 is made of a double width of metal 20$^a$ and 20$^b$. The inner end of the short arm 20$^b$ carries wings 18$^a$ similar to the wings 18 shown in Fig. 5. In making the cutter-arm from this form of blank, the metal is folded on the dotted lines 16$^a$ upon the under face of the arm 20$^a$, the cut-away portion 22 and a slot 23 obviating the three thicknesses of metal on one edge where the cutter-arm rests on the raised center 2. After this folding over on the dotted lines 16$^a$, the cutter arm is fashioned up the same as from the blank shown in Fig. 5, but presents a somewhat neater appearance in that a semi-circular projection 24 from the arm 20$^a$ entirely closes the opening 12 in the raised portion 2 of the disk 1.

In the operation of the device, the disk 1 is placed over and concentric with the pie-plate containing the pie and pressed down on the same, which forces the corrugations 4 into the outer edge of the pie, corrugating the layers and securely sealing them together. The protuberances 5 at the same time puncture the pastry of the pie, forming ventilating holes, and by reason of their arrangement indicate the slices into which the pie is to be cut. While the device is held to the pie-plate, the plate and disk are revolved relatively to the cutter-arm, which latter trims off the overhanging edge of the dough and leaves the pie in readiness for the oven, thereby avoiding the tiresome process of trimming as ordinarily with a case knife. The disk 1 has near its periphery 3 a nail-hole 25, by which the device is suspended upon the wall, as shown in Fig. 1, and is so arranged that when the disk is hung up, the cutter-arm will not cover any material part of the lettering. In case any article recorded on the face of the disk becomes exhausted in the kitchen, the indicator adjacent to its name is pointed toward it, which acts as a constant reminder that the particular article should be replaced. The face of the disk is preferably colored with a plurality of waterproof colors, to make the device attractive in appearance.

It is evident that various changes and modifications can be made in my device without departing from the spirit of my invention, and I desire to claim all such as fall within a fair interpretation of the annexed claims.

Having thus described my invention, I claim as new and desire to secure by Letters Patent:

1. In a kitchen device, the combination of a disk having a raised center and a raised periphery, a corrugated depression extending around the periphery, a series of conical protuberances on the under face of the disk, said conical protuberances being arranged in diametrical rows dividing the disk into an equal number of parts, and a cutter-arm pivoted to the center of the disk and having a cutter-blade at its outer extremity.

2. The combination of a disk, a plurality of rows of protuberances equally spaced apart, extending from the bottom of the disk, said disk having a corrugated periphery, and a cutter-blade pivoted to the center of the disk.

3. The combination of a sheet metal disk having a corrugated periphery, and a trimming blade pivoted to the center of the disk and adapted to swing about the corrugated periphery, for the purpose described.

4. The combination of a disk, a plurality of rows of protuberances equally spaced apart and extending from one side of the disk, and means for covering said protuberances, said means having indicators for the purpose described.

5. The combination of a disk, a plurality of rows of protuberances equally spaced apart and extending from one side of the disk, caps for covering the protuberances, and indicators carried by the caps, for the purpose described.

6. The combination of a disk, a plurality of rows of protuberances equally spaced apart and extending from one side of the disk, guide slots concentric with each protuberance, a cap having guides rotatable in the slots, and an indicator arm carried by the cap, for the purpose set forth.

7. The combination of a disk, a cutter-arm pivotally mounted at the center of the disk, a plurality of rows of protuberances equally spaced apart and extending from one side of the disk, guide slots concentric with each protuberance, a cap having guides rotatable in the slots, and an indicator arm carried by the cap, for the purpose set forth.

8. The combination of a sheet-metal disk, a sheet-metal trimming arm pivoted to the center of the disk, said arm and its pivotal connection being composed of a single piece of sheet-metal, a plurality of rows of protuberances equally spaced apart and extending from one side of the disk, guide slots concentric with each protuberance, a cap having guides rotatable in the slots, and an indicator arm carried by the cap, for the purpose set forth.

In testimony whereof I have signed my name to this specification in the presence of two subscribing witnesses.

EDWARD ADAMS HUDSON.

Witnesses:
    S. E. FORBES,
    FRANCES LINELL.